Aug. 4, 1959    B. NICHOLS ET AL    2,897,745
ROTARY MOLD FOR SAUSAGE
Filed Jan. 16, 1957    4 Sheets-Sheet 1
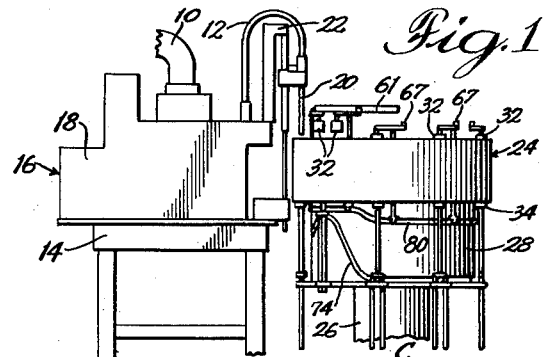
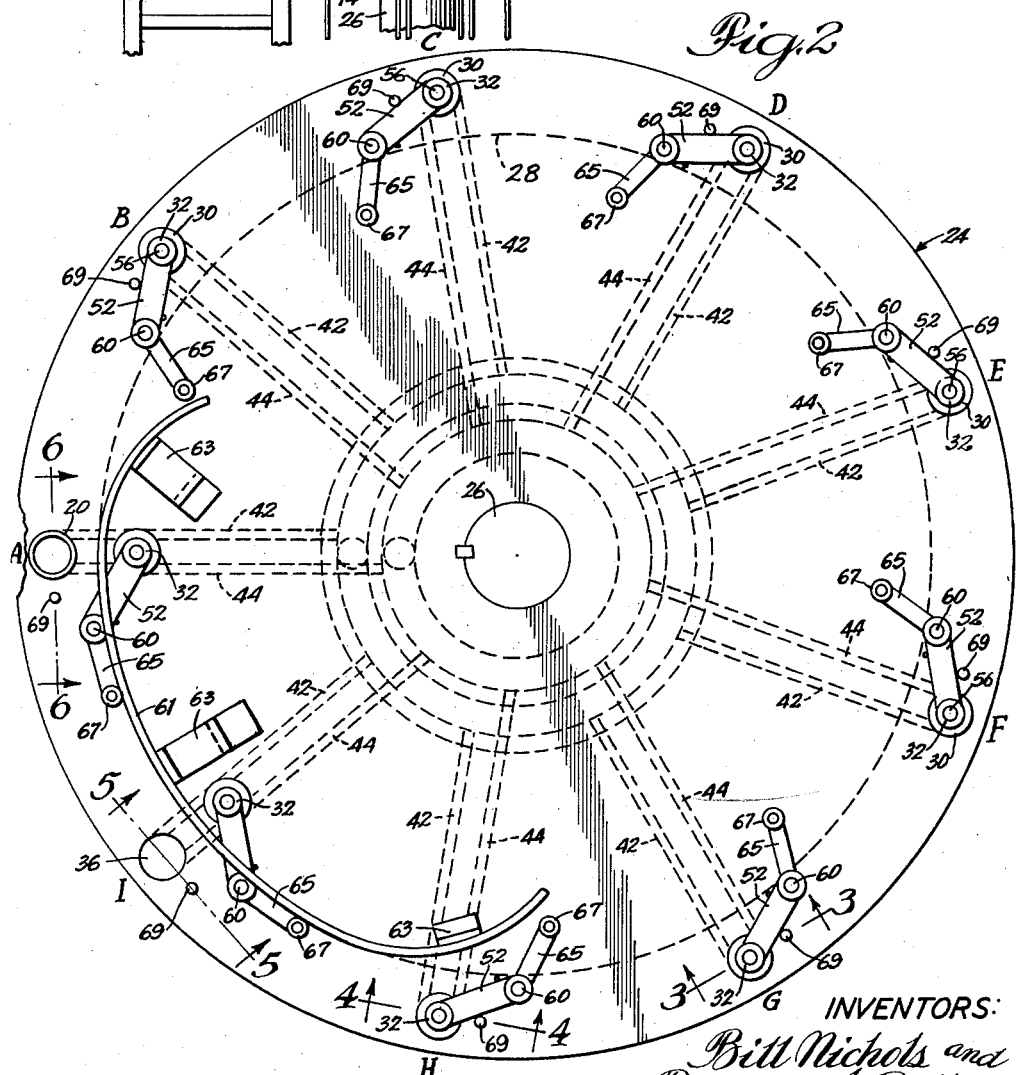
INVENTORS:
*Bill Nichols and
Richard W. Rath,*
BY *Bair, Freeman & Molinare*
ATTORNEYS.

Aug. 4, 1959  B. NICHOLS ET AL  2,897,745
ROTARY MOLD FOR SAUSAGE

Filed Jan. 16, 1957  4 Sheets-Sheet 2

INVENTORS:
Bill Nichols and
Richard W. Rath,
BY Bair, Freeman & Molinare
ATTORNEYS.

Aug. 4, 1959   B. NICHOLS ET AL   2,897,745
ROTARY MOLD FOR SAUSAGE
Filed Jan. 16, 1957   4 Sheets-Sheet 3
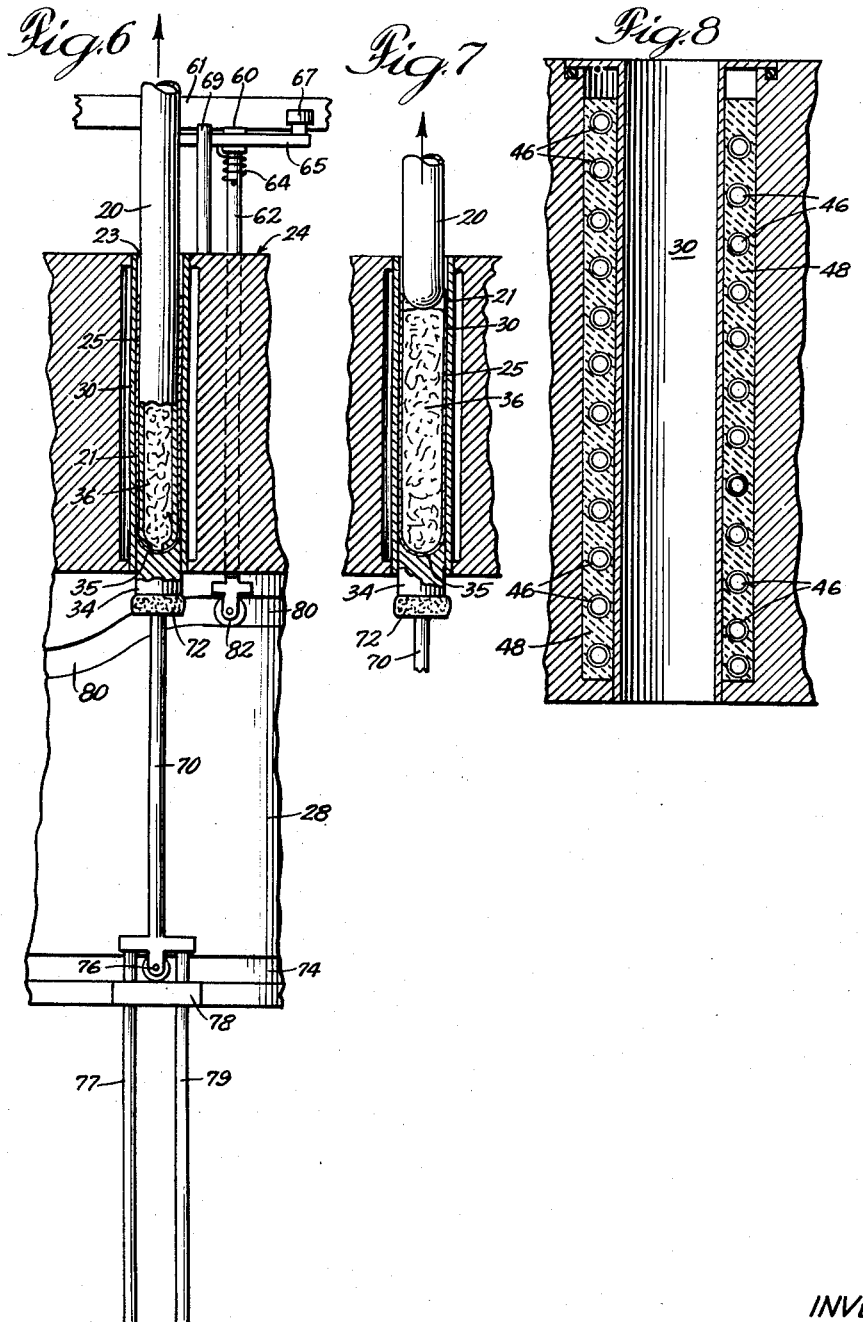
INVENTORS:
Bill Nichols and
Richard W. Rath.
BY Bair, Freeman & Molinare
ATTORNEYS.

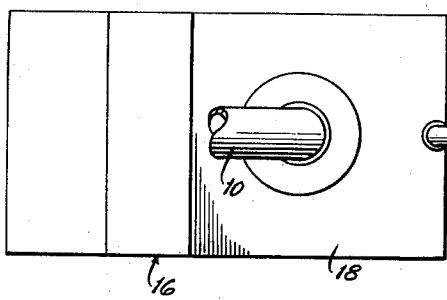
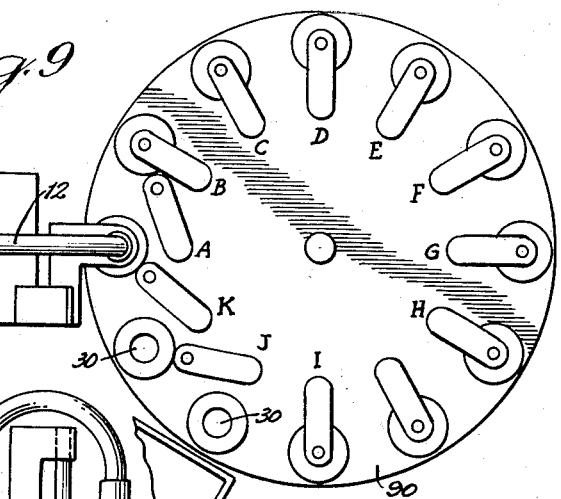
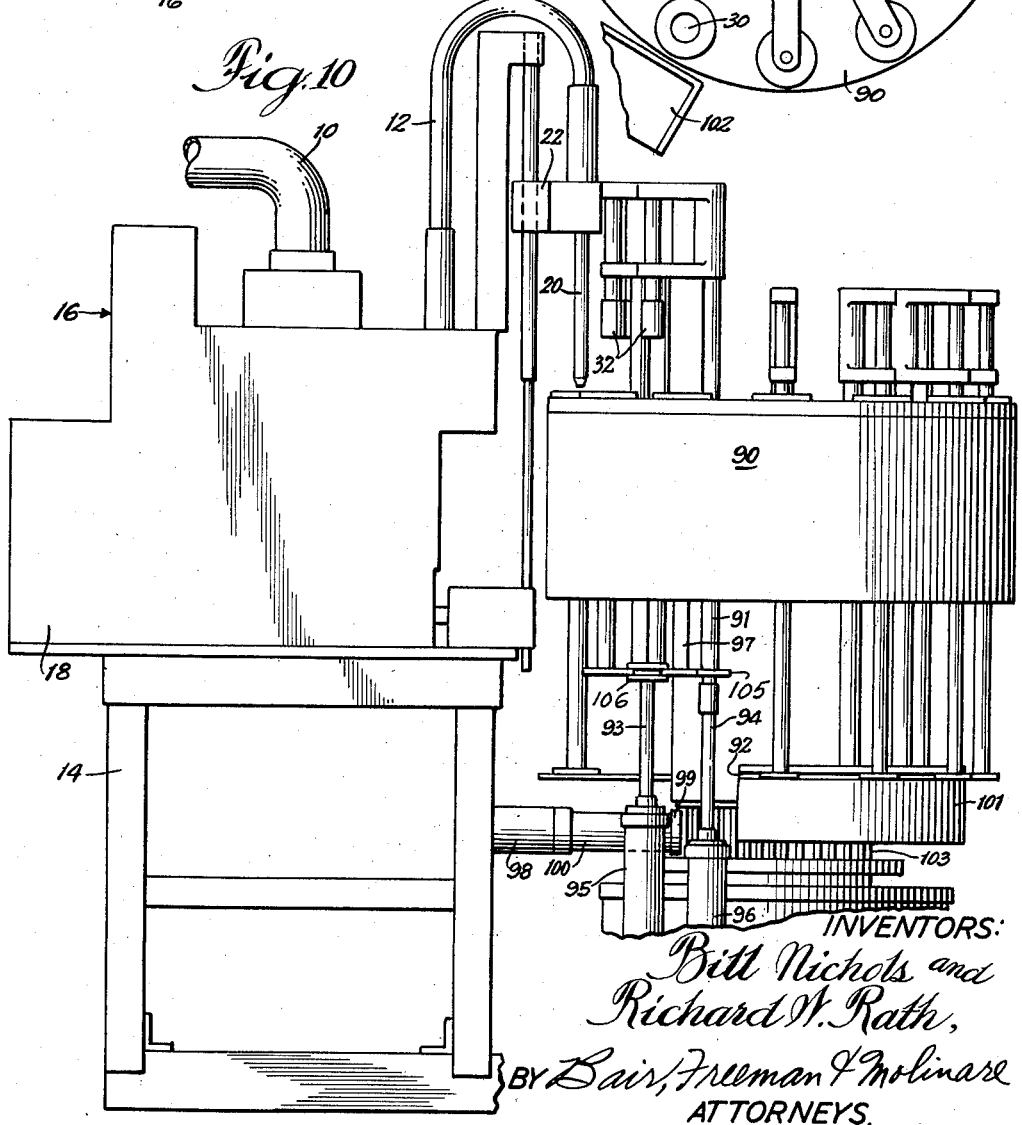

United States Patent Office 2,897,745
Patented Aug. 4, 1959

2,897,745

ROTARY MOLD FOR SAUSAGE

Bill Nichols and Richard W. Rath, Waterloo, Iowa, assignors to Rath Packing Company, Waterloo, Iowa, a corporation of Iowa Application January 16, 1957, Serial No. 634,473

17 Claims. (Cl. 99—427)

This invention relates to the manufacture of sausages, and more particularly to improvements in the manufacture of continuously molded sausages and the like.

Several techniques in the manufacture of sausages are known and have been utilized in the sausage manufacturing industry. The most common of these techniques comprises stuffing an emulsion having suitable amounts of meat, spices and other ingredients therein into an elongated cellulose casing. The stuffing generally is accomplished by means of a piston which forces the emulsion under pressure from a nozzle into the casing until the latter is filled. The filled casing generally then is divided into a plurality of separate but connected links of equal length which are heat processed and subsequently separated from each other for further processing and packaging. One of the chief disadvantages of this process is the variation in the weight of the finished sausage. During stuffing of the casing, the operator holds back the casing to insure sufficient resistance to completely fill the casing, which may be many feet long. Hand pressure is not uniform, no matter how skilled the operator, and the density of the sausage will vary along the length of the casing. Consequently, the individual sausages tied off in the casing will vary in weight. To provide the customary one pound cellophane wrapped package, the sausages must be weighed out manually like apples or onions, the weigher replacing light ones for heavier ones on the scale (or vice versa) until a balance is struck. The cost increase due to such a tedious procedure is obvious.

Another disadvantage of this hand stuffing process is that the casing must be removed to provide a skinless sausage. Machines have been devised for this purpose but none of them has been completely satisfactory. Even the most efficient machines fail to remove some of the skins and, of course, these must be removed by hand.

Another unedsirable feature of this conventional process is the high bacteria count carried by sausages because of contact with human hands. The contact occurs during weighing into packages and in some instances when stripping the casing, as indicated. Even hands which have been most thoroughly washed with an antiseptic impart bacteria to the sausage which results in more rapid sliming and molding than in those cases where contact with humans is eliminated completely.

The primary object of this invention is to provide an improved method and means for obviating the above noted disadvantages, while producing a sausage product that duplicates the conventional casing-stuffed sausage in quality and taste.

It is another object of this invention to provide an improved method and means for the manufacture of continuously molded sausages of uniform weight.

It is still another object of this invention to provide improved means for manufacturing continuosly molded sausages which eliminates the economically undesirable steps of filling the casing and subsequently removing the casing after curing of the sausage.

It is still another object of this invention to provide improved means for manufacturing sausages wherein the sausage is not touched by human hands either during manufacture or during packaging.

It is a further object of this invention to provide an improved process for sausage manufacturing wherein the sausage is molded with a select protein film on the surface thereof similating conventional product surface and sheen.

It is a still further object of this invention to provide an improved method and means for the continuous manufacture of molded sausages which have no surface blemishes, which are formed with normal curvature and rounded ends, and which have the internal texture and density of sausages made by the conventional stuffing technique.

It is a still further object of this invention to provide improved means for the continuous manufacture of molded sausages which is capable of processing large numbers of sausages in a relatively short time.

A further object is to provide an improved mold for shaping and curing sausages of variable volume and capable of imposing substantially uniform pressure on the sausage meat during curing.

In accordance with features of a specific illustrative embodiment of this invention, a rotary table is provided with a plurality of individual sausage molds placed at molding stations uniformly spaced around the table. Each mold comprises a hollow tubular member of predetermined length and diameter, the axis of which is parallel to the axis of rotation of the table. A pair of movable end plugs having suitably shaped concave inner surfaces is adapted to slide into tight fitting relation with the open ends of the tubular member, thereby to define a sausage molding enclosure of variable volume. By adjusting the distance between the plugs the volume may be varied to compensate for variation in the density of the meat emulsion charged into the molds, thus providing a sausage of constant weight.

Suitable heating means are associated with each sausage mold for cooking the emulsion therein during operation of the device. The table in which the molds are placed is adapted to be rotated intermittently by suitable drive means provided therewith for indexing the molding stations in sequence past filling and ejecting means in accordance with the molding cycle.

During the molding cycle each molding station is indexed beneath a retractable filling nozzle connected to a stuffer. The stuffer is filled with an emulsion comprising suitable amounts of meat and various other ingredients which advantageously may be prepared in the absence of oxygen to cause a speed-up in the reaction time of color fixation during heat processing. When a molding station is beneath the filling nozzle, the bottom end plug is placed in close fitting position within the lower end of the mold and the top end plug is held displaced from the upper end of the mold. In accordance with a feature of this invention the filling nozzle is moved downward into the bottom of the mold just above the bottom end plug, and then it is withdrawn at a rate which produces uniform turbulence and density of emulsion as the latter leaves the nozzles during retraction.

If desired, the mold may be coated with protein matter prior to injection of the meat emulsion. The purpose of such coating is to impart to the molded sausage a sheen such as that which normally results from migration of soluble proteins to the inner surface of the casing during the 3 to 3½ hour cook of the conventional process. A viscous protein solution or suspension, or a sausage emulsion containing a minimum of fat and a maximum of protein, is suitable for this purpose. The protein solution or suspension should have the viscosity of a heavy motor oil so that it will remain in contact with the walls of the mold. A measured volume of the protein material may be dropped into the mold just prior to the filling step. The protein may conveniently be distributed over the mold surface in a thin film by inserting a mandrel within the mold to displace the protein and cause it to flow into a narrow space between the mandrel and the mold. This clearance may range from .010" to .030". An extra station may be included in the apparatus for this purpose, but preferably the filling nozzle is of suitable dimensions to serve in the dual capacity of a mandrel and a nozzle. The employment of the nozzle for distributing the protein causes the protein film to remain in contact with the mold surface since the sausage emulsion ejected from the nozzle replaces the space occupied by the nozzle as the nozzle rises. The nozzle preferably is equipped with a check valve to prevent flow of protein back into the nozzle and the emulsion therein.

Following the filling of the mold the top end plug is moved over the upper end of the mold and is lowered into place over the emulsion therein. During this operation, the top plug vents the entrapped air in the mold through a relief valve provided therein. If desired, a cavity of calculated volume may be provided in the plug to receive non-condensibles. It is another feature of this invention that since each mold is filled from the bottom no air is entrapped between the sausage and the mold. This insures a smooth continuous external surface on the finished product.

Variable pressure is exerted upon the emulsion in the mold by suitable means such as a spring which urges the top plug downwardly during the molding cycle. The molds are maintained at a temperature of about 150° so that the temperature of the sausage emulsion is brought up to approximately 140° at the center within a few minutes. The cooking cycle requires from 4 to 10 minutes total time. A complete cook can be effected in approximately 10 minutes. The molded sausage may be smoked subsequently if desired, and it may also be dipped to provide improved sheen. If the cycle is reduced to 4 minutes, it is desirable to impart additional cook after removal from the mold, which may be accomplished within 5 to 30 minutes in an oven maintained at 170° to 325° F. It is important in molding that the interior of the sausage reach coagulation temperature to fix the internal structure and prevent shriveling after removal from the mold. During the curing cycle the pressure imposed upon the emulsion may range between 50 and 70 pounds per square inch. Some expansion does occur in the mold during cooking, primarily due to expansion of entrained air or other gases within the sausage emulsion. By employing a spring biased top plug, the pressure will remain substantially constant irrespective of changes in volume of the sausage. This is an important feature of the invention. So far as we are aware prior molding processes did not provide for varying the volume of the mold during curing. As a result, the product was dense, particularly at the surface, and lacked the desirable spongy texture resulting from controlled expansion of the entrapped gases. The spongy texture is coupled with tenderness in the product sausage. In this manner the present process closely simulates the conventional cook in a casing since the casing is capable of expansion with the sausage enclosed thereby.

Upon completion of the molding cycle, sufficient rendering has taken place so that the sausages may be freely ejected from the mold. Protein solution also facilitates parting the product from the mold. The molds may be heated by warm fluid circulating therearound in a jacket or electrically, as by electrically heated elements or high frequency current. In the latter case, the molds must be made from dielectric material such as glass.

As each mold is indexed to the end stations in the molding cycle, its top end plug is again swung away from the mold upper end to permit ejection of the sausage. The bottom end plug is utilized for this purpose and is moved up in the mold to eject the molded sausage. The mold advantageously may be cleaned by means of a brush or the like and the mold is indexed under the filling nozzle to enable the molding cycle to be started anew.

It will be appreciated that since the filling nozzle is extended downwardly into the base of the mold and fills as it retracts, exact uniformity of size and weight in the molded sausages can be controlled. Thus, sausages manufactured in accordance with the invention can be adapted for automatic packaging and storage for shipping without the necessity of manual handling. Furthermore, the molded product has an internal texture and a smooth external appearance that closely resembles a sausage made in the conventional casing.

The above and other features of novelty which characterize the invention are pointed out with particularity in the claims annexed to and forming a part of this specification. For a better understanding of this invention, its advantages, and specific objects attained by its use, reference is had to the accompanying drawing and descriptive material in which is shown and described an illustrative embodiment of the invention.

In the drawing:

Figure 1 is an elevational view of one embodiment of a cam operated sausage molding apparatus in accordance with the invention;

Figure 2 is an enlarged top plan view of the molding table of the embodiment of Figure 1;

Figures 3, 4, 5, 6 and 7 are elevational views in cross section showing the sequence of operations for a single sausage mold in the molding table of the embodiment shown of Figures 1 and 2;

Figure 8 is an elevational view in cross section of an embodiment of a sausage mold having electrical heating elements;

Figure 9 is a top plan view of a hydraulically operated molding apparatus in accordance with another embodiment of the invention; and Figure 10 is a side elevational view of the molding apparatus embodiment of Figure 9.

Figure 3:
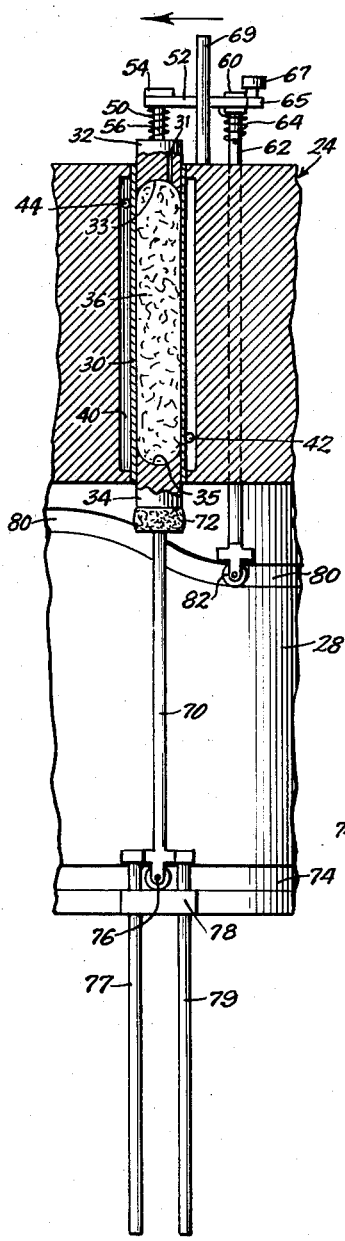
Figure 4:
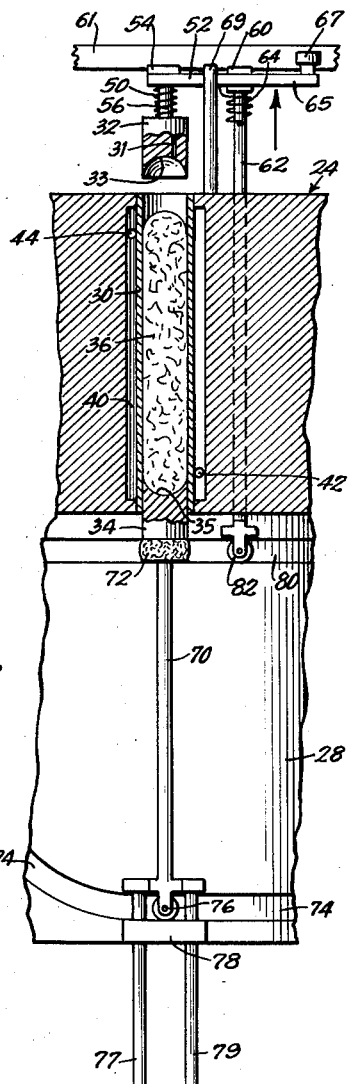

Referring now to the drawing, and more particularly to Figures 1 and 2 thereof, there is shown a specific illustrative embodiment of the invention adapted for the manufacture of sausages and the like of uniform density to the end that there is little or no variation in the weight of the finished sausages manufactured thereby. An emulsion comprising a number of sausage ingredients including suitable proportions of meat and other processing materials is fed from a standard stuffer (not shown) to the sausage mold filling apparatus 16. The apparatus for preparing the emulsion such as the chopper and the stuffer, may be of any type well known in the art and, therefore, these devices have not been shown as they do not form a part of this invention.

The mold filling apparatus 16 is supported by a platform or table 14 and is connected directly to the stuffer by means of sanitary piping 10. Filling apparatus 16 comprises an enclosure 18 for receiving the sausage emulsion from the stuffer and includes a filling nozzle 20 connected to enclosure 18 by a piece of flexible tubing 12. Filling nozzle 20 is mounted on a rack and pinion assembly 22 such that nozzle 20 may be extended thereby downwardly into the bottom of a mold and subsequently retracted therefrom while filling the mold with the emulsion. A typical filling device of this type is illustrated in Patent 2,715,489.

Filling apparatus 16 comprises means for metering the emulsion extruded from filling nozzle 20 to the end that a predetermined volume is extruded on the removal stroke of the nozzle. One machine which advantageously may be adapted for this purpose is manufactured by the Arthur Colton Co. of Detroit, Michigan and is sold commercially as "Model 175."

The molding table 24 consists of a plurality of cylindrical molds 30 vertically disposed in uniformly spaced relation around the marginal area of the molding table. The cylindrical molds are indexed in sequence and at periodic intervals under filling nozzle 20 such as by an intermittently driven shaft 26 rotatably positioned through the center of cam drum 28 and fixedly secured to the molding table 24. In this manner, a mold is filled with emulsion by the filling nozzle and is indexed past a plurality of molding stations, designated as A, B, C, D, E, F, G, H and I in Figure 2, in each molding cycle.

In accordance with a specific embodiment of this invention, as shown more clearly in Figures 3 through 7 of the drawing, each mold 30 comprises a piece of tubing which advantageously may be chrome plated or formed of stainless steel. Preferably, the interior surface of the mold should have a high finish to the end that the sausages processed therein have a desirable surface and that their ejection from the mold be facilitated. If desired, the mold may be provided with a coating of polytetrafluorethylene on its interior surfaces to preven adhesion of the sausage to the mold. However, it has been found that with molds constructed in accordance with the above description the natural "rendering" (fat migration to the surface) of the sausage during curing operates to effect relatively easy ejection of the sausage from the mold with the result that the need for release agents substantially is reduced or eliminated.

In accordance with one embodiment of the invention mold 30 is approximately 8 inches long and has a diameter of ⅞ inch. It will be appreciated that from the viewpoint of sales appeal it is desirable to manufacture sausages of conventional size and shape, including rounded ends. This is provided by means of a top end plug 32 and a bottom end plug 34, each adapted to be placed in close fitting position within mold 30. Top end plug 32 has a concave surface 33 for shaping the emulsion at one end of sausage 36 and bottom end plug 34 has a concave surface 35 for shaping the emulsion at the other end of sausage 36.

End plugs 32 and 34, which resemble pistons, each have a diameter slightly less than the inner diameter of mold 30 such that they may be inserted in tight fitting relation (about .0025″ clearance) with the top and bottom ends of the mold during the molding cycle. At the beginning of the cycle, i.e., when a mold 30 is indexed by rotary molding table 24 to station A directly beneath filling nozzle 20, its top end plug 32 is moved away from the top of mold 30 to permit filling nozzle 20 to be lowered into the mold for extruding the sausage emulsion thereinto. At this time, bottom end plug 34 is positioned in place at the lower end of the mold.

Figures 6 and 7 illustrate the filling action of nozzle 20 at this point in the molding cycle. Nozzle 20, which preferably is shaped at its discharge end 21 to the contour of the mold bottom, is lowered into mold 30 by the rack and pinion assembly 22 of the filling apparatus 16. A measured quantity of protein material previously placed in the mold is displaced by the nozzle to fill the annular space 23 between the nozzle and the mold. Thus, a film 25 of protein is deposited on the mold surface which subsequently constitutes a shiny coating for the cured sausage. Nozzle 20 is retracted at a rate which produces uniform turbulence and density throughout the emulsion discharged from the nozzle during retraction. The emulsion replaces the space occupied by the nozzle and hence holds the protein film 25 in place. It will be appreciated that since the mold is filled from its bottom upwards and since the emulsion is not packed into the mold under very high pressures, in contradistinction to prior art devices, a sausage of a desired weight and size may be formed within the mold.

When filling nozzle 20 is fully withdrawn from mold 30, the desired amount of emulsion has been discharged into the mold. In accordance with a preferred embodiment of the invention, filling apparatus 16 is set to meter exactly 1.7 ounces of emulsion per individual mold. With the natural weight loss that normally occurs during the processing of sausages, each finished sausage has a weight of 1.6 ounces or slightly higher. The weight loss will vary with the sausage formulation, but the volume dispensed can be adjusted accordingly. This uniformity of weight allows automatic handling and wrapping of the sausages into one pound packages of ten sausages each without the complication of manual weighing and checking procedures.

After the filling of mold 30, molding table 24 is indexed around to station B to permit the following mold to be filled at station A in the manner described. At this time, the top end plug 32 of the previously filled mold is swung in place thereover and lowered into position within the mold as shown in Figure 3.

Advantageously, any entrapped air in the top of the mold is vented through a relief hole 31 provided in top end plug 32. It will be appreciated that since, as explained above, the mold is filled from the bottom, no air is entrapped in the bottom end of the mold.

The filled mold continues to be indexed from one station to another in accordance with the intermittent rotational rate of the molding table. It is contemplated that in a molding table having ten molding stations, for example, the molding cycle will be approximately four to six minutes for each mold. During this time the mold is heated to cure the emulsion therein. In accordance with one aspect of the invention this heating is provided by a fluid of controlled temperature caused to circulate in a jacket 40 positioned around each cylindrical mold. Hot water having a temperature of about 150° F. or slightly higher is introduced into jacket 40 by means of an inlet conduit 42 and is removed by an outlet conduit 44 provided with each mold 30. Water of this temperature in a preferred molding cycle of four to six minutes serves to denature the protein in the surface of the sausage to thereby give the latter a permanent shape at an internal temperature of approximately 140° F.

Any other suitable means of heating the emulsion during the molding cycle may be employed in lieu of the hot water heating means just described. For example, as shown in Figure 8, the mold may be heated by means of an electrical heating element 46 wound in coiled coil form about the cylindrical mold 30. The coils of heating element 46 may be supported in spaced relation relative to each other by any suitable insulating material 48 disposed around mold 30.

During the curing operation, the emulsion preferably is maintained under substantially constant elevated pressure. This serves to enhance the surface appearance of the finished sausage as well as assuring that the ends of the sausage will have the rounded form of concave surfaces 33 and 35 of end plugs 32 and 34 respectively. In one embodiment of the invention, pressures of approximately 60 pounds per square inch have been found desirable. As shown in Figure 3, this pressure is applied to the top end plug 32 of each mold by means of a coiled spring 50 placed in compression between top end plug 32 and a cross member 52. The latter is adapted to support the top end plug by providing a stop for a cap 54 connected to a post 56 inserted through an aperture in cross member 52 and secured to top end plug 32. It will be appreciated that this construction permits the top plug to move upwardly against the compressive force of the spring upon change in volume of the mold material, while exerting substantially constant pressures. The changes in volume which occur are not large but it is important that expansion be permitted to take place to provide the desired texture.

When a filled mold is indexed around to end station H in the molding cycle, its top end plug 32 is pivoted away therefrom to enable the ejection of the cured sausage from the mold. This is brought about by the plug lifting and turning mechanism best shown in Figures 2, 3 and 4. A cross member 52 is attached at pivot 60 to cam shaft 62. A coiled spring 64 is wound around cam shaft 62 and is fixedly secured at one end to the cam shaft and at the other end to cross member 52.

A follower link 65 is attached in fixed angular relation to the cross member 52 of the mold. A follower 67, which may comprise a roller or the like, is positioned at the end of follower link 65. An arcuate track 61 is secured above the sector of rotary table 24 defined by molding stations H, I, and A, and is held in fixed position relative to the table by means of track support members 63.

In the operation of the molding device cam shaft 62 is raised at molding station H, in a manner described in greater detail below, to lift top end plug 32 out of its position within mold 30. At this time, follower 67 is placed into operative engagement with arcuate track 61 with the result that cross member 52 is pivoted at pivot 60 to swing top end plug 32 inwardly and displace it from vertical alignment with its mold 30. The top end plug is held in this displaced position while the mold is indexed past molding stations I and A to permit the cured sausage in the mold to be ejected therefrom and the mold to be refilled with emulsion from nozzle 20 at the beginning of a new molding cycle.

Track 61 is terminated between molding stations A and B to disengage follower 67 and thereby follower link 65 and cross member 52. At this point spring 64 acts to rotate the top end plug on pivot 60 back to its original position above the mold so it is fitted within the mold when cam shaft 62 is lowered. Advantageously a guide 69 may be provided for each mold to stop the rotation of cross member 52 and properly align each top end plug 32 above its mold 30.

Figure 5:
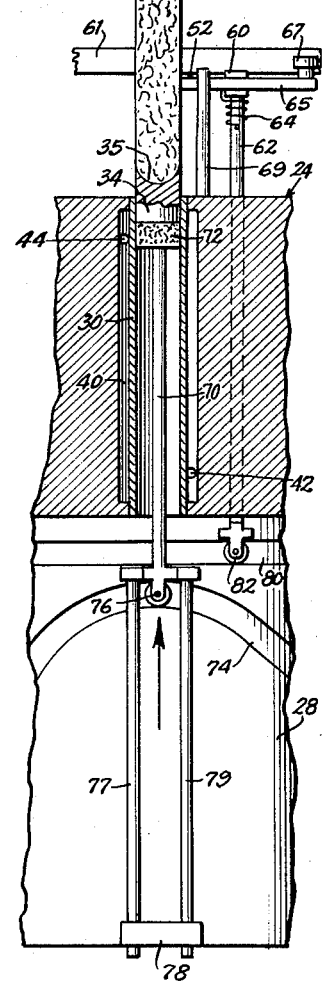

When the mold reaches station I, its bottom end plug 34 is raised upwardly through mold 30 by cam shaft 70 as shown in Figure 5 and as described more fully below, to eject the cured sausage 36 from the mold and upon a suitable receiving surface. Advantageously, the mold may be cleaned, as by a brush 72 positioned below bottom end plug 34, before the latter is replaced to its emulsion receiving position. If desired, apparatus for blowing air through mold 30 at this time may be provided. The mold then is indexed once again beneath filler nozzle 20 at station A for another filling of sausage emulsion to start the molding cycle anew.

In accordance with one specific embodiment of the invention the top and bottom end plugs of each mold 30 are actuated at the proper times in the molding cycle by suitable cam mechanisms operatively associated with molding table 24. Thus, as best shown in Figures 3 through 6, a cam track 74 in the form of a recess is provided to run substantially around the cam drum 28 secured to the lower portion of the molding table 24 and is adapted to control the operation of the bottom end plugs 34 of each of the cylindrical molds 30. Each bottom end plug 34 is secured to a cam shaft 70 which is connected at its lower end to a cam follower which may be in the form of a roller 76 adapted to ride in the recess of lower cam track 74. Follower 76 advantageously may be guided in a vertical direction by a pair of guide posts 77 and 79 adapted to be freely slidable in a suitably apertured or grooved guide member 78 which slides along the inturned edge at the bottom of cam drum 28. The cam drum 28 may be vertically adjustable to permit varying the disposition of the end plugs 34 in the molds for modifying the length of the sausage.

For the greater portion of the molding cycle, and particularly that portion corresponding to the molding stations A through H, lower cam track 74 runs substantially in a straight line. At molding station I, the portion of the cycle whereat the sausage is ejected from the mold, cam track 74 has a substantially inverted U-shape form (see Figures 4 and 5) so that the bottom end plug 34 is caused to rise within its mold 30 and eject sausage 36 at station H, corresponding to the highest portion of lower cam track 74. Lower cam track 74 returns to its straight line position between stations I and A to again place the bottom end plug in emulsion receiving position.

An upper cam track 80 is provided in operative association with the molding table to actuate the top end plug 32 of each mold at the proper intervals during the molding cycle. Upper cam track 80 runs in essentially two levels around the table. The lower of these two levels runs approximately between molding stations B and G so that during this interval the upper end plug 32 is in position within its mold. The higher level of upper cam track 80 runs approximately between molding stations H and B so that during this interval the upper end plug 32 is moved upwardly and laterally away from the mold to permit ejection of the cured sausage therefrom and the subsequent filling of the mold with additional sausage emulsion from filling nozzle 20 at station A.

A follower 82 in the form of a roller is adapted to ride in the recess defined by upper cam track 80. Follower 82 is maintained freely rotatably at the lower end of cam shaft 62. In this manner cam shaft 62 acts as a follower for the cam track 80 to properly operate its associated upper end plug 32 during the molding cycle.

Another embodiment of the invention is shown in Figures 9 and 10 of the drawing. This embodiment is similar to the cam operated embodiment described above in that sausage emulsion is supplied from the stuffer to the mold filling apparatus 16 by means of sanitary piping 10. The emulsion in the filling apparatus is supplied through flexible tubing 12 to the filling nozzle 20, which advantageously in mounted on the rack and pinion assembly 22 such that the nozzle may be extended downwardly into the bottom of a mold 30 and subsequently retracted therefrom while filling the mold with the emulsion.

In this embodiment of the invention which is shown as a twelve station molding device comprising stations A through K, the rotary molding table 90 is provided with a partial cam drum having a cam track 92 running around approximately three quarters of the circumference of the table. Cam track 92 discontinues at molding station I, the station where the upper end plug 32 is lifted out of the mold and starts again at station B, the station following the one where the mold is filled with emulsion from the nozzle 20. Thus in the specific twelve station embodiment shown in Figures 9 and 10 no cam track is provided for stations J, K and A. For the remaining nine molding stations the cam track 92 is utilized to provide support for the bottom end plug 34 of each mold such that it will not fall out or become nonoperative during the molding cycle.

After leaving molding station I in the embodiment shown in Figures 9 and 10, the mold is indexed to station J where cam shaft 91 of the top end plug of the mold is positioned over piston 94 of hydraulic cylinder 96. Hydraulic cylinder 96 is operated to raise cam shaft 91 and thereby lift upper end plug 32 out of its mold 30. The upper end plug then is displaced from the top of the mold in any suitable manner, such as that described above, to permit ejection of the sausage therein. Molding table 90 then is indexed to the next station, station K, where piston 93 of hydraulic cylinder 95 is operated to raise the cam shaft 97 of the lower end plug 34 up through the mold to thereby eject the sausage upon a receiving platform 102. The disc 105 on the bottom of shaft 91 engages the annular collar 106 on the top of piston 93 as the table 90 rotates. As in the case of the previous embodiment a brush and/or air blowing apparatus may be associated with the bottom end plug for cleaning the mold during this ejection operation.

Molding table 90 then is indexed to station A where the bottom end plug 34 is lowered to its emulsion receiving position by the retraction of piston 93 of hydraulic cylinder 95. The mold is again filled with emulsion from nozzle 20, top end plug 32 is lowered into position within the mold and the molding cycle is repeated.

The desired intermittent drive for molding table 90 advantageously may be provided by means of a third hydraulic cylinder 98 operatively associated with a ratchet wheel 99 disposed around the base 103 of molding table 90. Thus hydraulic cylinder 98 is intermittently operated to cause a pawl (behind wheel) connected to its piston 100 to engage the teeth of ratchet wheel 99 and index table 90 around at the desired rate in accordance with the molding cycle. It will be appreciated that other suitable means for indexing the molding table around at a desired rate may be provided in lieu of the ratchet cylinder 98.

It will be understood by those skilled in the art that other modifications may be made in the construction and arrangement of the parts in the above described sausage molding device without departing from the real spirit and purpose of the invention and that it is intended to cover by the appended claims any modified forms of structure or use of equivalents which reasonably may be included within their scope.

What is claimed is:

1. Apparatus for molding sausages of uniform weight comprising a rotary table, a plurality of elongated tubular molds spaced around said table, the axis of each of said molds being parallel to the axis of rotation of said table, a top end plug and a bottom end plug operatively associated with each of said molds, a nozzle for ejecting sausage emulsion, means for lowering the nozzle into a mold and retracting the nozzle from the mold, means for causing sausage emulsion to be ejected into said mold during the retraction of the nozzle whereby said mold is filled with emulsion having uniform density throughout, means for maintaining the bottom end plug of each mold in emulsion receiving position while emulsion is being ejected thereinto and for maintaining the top end plug of the mold displaced from the mold, means for placing the top end plug in position in the mold after the mold has been filled with emulsion and the nozzle has been withdrawn therefrom, means for indexing the rotary table around its axis to fill each mold with emulsion in a sequential manner, heating means disposed in operative relation with each of said molds for heating the emulsion therein during said indexing, means for removing the top end plug from each mold after the emulsion therein is heated and means for causing the bottom end plug to traverse the mold to eject the sausage therefrom and for subsequently lowering the bottom end plug to its emulsion receiving position.

2. Apparatus for molding sausages of uniform weight in accordance with claim 1 further comprising means associated with each mold for cleaning the mold after a sausage has been ejected therefrom.

3. Apparatus for molding sausages of uniform weight in accordance with claim 2 wherein the means for cleaning the mold after ejection of a sausage comprises a brush attached to the lower portion of said bottom end plug.

4. Apparatus for molding sausages of uniform weight in accordance with claim 1 wherein each of said end plugs comprises a cylindrical member having a diameter slightly smaller than the inner diameter of its associated mold so as to maintain a relatively tight fit therewithin, said member further having a concave surface at its emulsion engaging portion for shaping the ends of the sausages formed in said mold.

5. Apparatus for molding sausages of uniform weight in accordance with claim 1 wherein said means for maintaining the top end plug of the mold displaced therefrom during filling of the mold comprises an arcuate cam positioned in fixed relation with respect to said molds, and a cam follower attached to said top end plug and adapted when engaged by said cam to cause the top end plug to be displaced from the top of said mold.

6. Apparatus for molding sausages of uniform weight in accordance with claim 1 wherein the means for removing the top end plug from the mold to permit ejection of the sausage therefrom and for causing the bottom end plug to traverse the mold to eject the sausage comprises a pair of cam tracks and a pair of cam followers each associated with one of said cam tracks and coupled to one of said end plugs to cause the latter to be actuated during the proper interval in the mold cycle.

7. Apparatus for molding sausages of uniform weight in accordance with claim 1 wherein the means for removing the top end plug from the mold to permit ejection of the sausage therefrom and for causing the bottom end plug to traverse the mold to eject the sausage comprises a pair of hydraulic cylinders, each associated with one of said end plugs and adapted to be actuated for operating the end plugs during the proper interval in the mold cycle.

8. Apparatus for molding sausages of uniform weight in accordance with claim 1 wherein said heating means comprises a pair of conduits associated with each mold, and a jacket connected to said conduits in heating relation with each mold for enabling fluids of heating temperature to be circulated around each mold during the molding cycle.

9. Apparatus for molding sausages of uniform weight in accordance with claim 1 wherein said heating means comprises an electrical heating element including a coil of high resistance conductive material wound in heating relation around each mold.

10. Apparatus for molding sausages of uniform weight in accordance with claim 1 wherein said means for indexing the rotary table around its axis comprises a hydraulic cylinder including a piston, and a plurality of teeth forming a ratchet disposed around the rotary table in operative association with said piston.

11. Sausage molding apparatus comprising a plurality of molds positioned on conveying means, a top end plug containing a vent and a bottom end plug operatively associated with each of said molds, a nozzle for ejecting sausage emulsion mounted above said conveying means for vertical movement, means for lowering said nozzle into a mold and retracting it therefrom as sausage emulsion is ejected into said mold through said nozzle, and means for removing the top end plug from the mold while the nozzle is being lowered and retracted, and for replacing the top end plug in position in the mold after it has been filled with emulsion.

12. Sausage moulding apparatus in accordance with claim 11 further comprising means for indexing each of said molds beneath said nozzle to fill each mold with emulsion in a sequential manner, means for heating the emulsion in each mold during said indexing and means for ejecting the sausage from each mold after each heating.

13. Sausage molding apparatus comprising the combination of a plurality of molds, each having the form of an elongated cylindrical tube, a nozzle for ejecting sausage emulsion mounted above said molds for vertical movement into each mold, means for moving said molds beneath said nozzle, means for lowering said nozzle into successive molds and retracting it therefrom as emulsion is ejected into said mold through said nozzle, whereby said, mold is filled with emulsion of uniform density to form sausages of uniform weight.

14. Apparatus for molding sausages of uniform weight in a molding cycle comprising a rotary table, a plurality of elongated tubular molds spaced around said table, a top end plug containing a vent operatively associated with each of said molds and adapted to be placed into the mold and removed therefrom at selected intervals in the molding cycle, a sausage emulsion ejection nozzle mounted for vertical movement above said table, means for lowering said nozzle into said molds in seriatim and for withdrawing said nozzle as said sausage emulsion is being ejected into said mold, whereby said mold is filled with emulsion having uniform density throughout, said top end plug being placed into the mold after the mold has been filled with emulsion and the nozzle has been withdrawn therefrom, means for rotating the rotary table to fill each mold with emulsion in a sequential manner, heating means disposed in operative relation with each of said molds for heating the emulsion therein during the molding cycle, a bottom end plug associated with each mold, and actuating means for causing the bottom end plug to traverse the mold after such heating and when the top end plug has been removed from the mold to eject the sausage therefrom.

15. The method of molding sausages of uniform weight comprising the steps of providing a sausage mold having one closed end and one open end, ejecting sausage emulsion into said mold progressively from said closed end to said open end to provide uniform density of emulsion within the mold, enclosing said open end of the mold and simultaneously applying pressure to said sausage emulsion therein, heating the mold to cure the emulsion, opening one end of the mold after heating, and causing the sausage to be ejected from said mold.

16. The method of molding sausages of uniform weight comprising the steps of enclosing one end of a hollow mold, filling the mold with sausage meat from the closed end to provide a uniform emulsion density throughout the mold, enclosing the other end of the hollow mold, heating the mold to cure the sausage meat therein, opening at least one encolsed end of the mold, and ejecting the cured sausage from the mold.

17. The apparatus of claim 11 wherein said top end plug is yieldably mounted to impose substantially uniform pressure upon the sausage emulsion with changes in volume thereof during heating.

References Cited in the file of this patent

UNITED STATES PATENTS

| | | |
|---|---|---|
| 855,618 | Cunning | June 4, 1907 |
| 994,714 | Boyle | June 13, 1911 |
| 1,009,953 | Boyle | Nov. 28, 1911 |
| 2,217,336 | Eden | Oct. 8, 1940 |
| 2,654,121 | Nelson | Oct. 6, 1953 |
| 2,685,518 | Prohaska | Aug. 3, 1954 |
| 2,748,424 | Fay | June 5, 1956 |